US009229669B2

(12) United States Patent
Wang

(10) Patent No.: US 9,229,669 B2
(45) Date of Patent: Jan. 5, 2016

(54) DEVICE CONTROL SYSTEM, DEVICE CONTROLLER, AND DEVICE CONTROL METHOD

(71) Applicant: Weibo Wang, Kanagawa (JP)

(72) Inventor: Weibo Wang, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/644,483

(22) Filed: Mar. 11, 2015

(65) Prior Publication Data

US 2015/0261484 A1 Sep. 17, 2015

(30) Foreign Application Priority Data

Mar. 17, 2014 (JP) ................................. 2014-054220

(51) Int. Cl.
G06F 15/00 (2006.01)
G06F 3/12 (2006.01)
G06K 1/00 (2006.01)

(52) U.S. Cl.
CPC ............ *G06F 3/1236* (2013.01); *G06F 3/1203* (2013.01); *G06F 3/1287* (2013.01)

(58) Field of Classification Search
USPC ............................................... 358/1.1–1.18
See application file for complete search history.

(56) References Cited

U.S. PATENT DOCUMENTS

| 7,528,714 | B2 * | 5/2009 | Schlesier et al. ......... 340/539.13 |
| 7,792,927 | B2 | 9/2010 | Umehara et al. |
| 2013/0332513 | A1 * | 12/2013 | Honda .......................... 709/203 |

FOREIGN PATENT DOCUMENTS

| JP | 2003-324533 | 11/2003 |
| JP | 2005-141652 | 6/2005 |
| JP | 2006-092327 | 4/2006 |
| JP | 2007-249939 | 9/2007 |
| JP | 2007-249946 | 9/2007 |
| JP | 2012-203635 | 10/2012 |

* cited by examiner

*Primary Examiner* — Douglas Tran
(74) *Attorney, Agent, or Firm* — Cooper & Dunham LLP

(57) ABSTRACT

A device control system provided herein includes: a reservation unit that receives inputs of location identification information, a use date/time, and user identification information and makes a reservation so that a user can use a location and a device disposed at the location at the use date/time; a determination unit that acquires user position information and location position information and determines whether or not a predetermined relationship is established between the position of the user and position of the location within a first time period before start of the use date/time; a control information generation unit that acquires device information including at least device identification information for identifying the device on a network and uses the acquired device information to generate control information for controlling operation of the device; and a device control unit that controls operation of the device using the control information when the predetermined relationship is established.

14 Claims, 11 Drawing Sheets

| RESERVATION IDENTIFICATION INFORMATION | LOCATION IDENTIFICATION INFORMATION | USE DATE/TIME | USER IDENTIFICATION INFORMATION | FIRST DEVICE IDENTIFICATION INFORMATION |
|---|---|---|---|---|
| 201 | 001 | 2014/2/1 13:00 TO 15:00 | 301 | 101 |
| ⋮ | ⋮ | ⋮ | ⋮ | ⋮ |

FIG.8

| USER IDENTIFICATION INFORMATION | USER POSITION | | |
|---|---|---|---|
| | z | x | y |
| 301 | 7 | 50 | 10 |
| ⋮ | ⋮ | ⋮ | ⋮ |

FIG.9

| USER IDENTIFICATION INFORMATION | GENDER | AGE | HEALTH CONDITION |
|---|---|---|---|
| 301 | MALE | 52 | A |
| ⋮ | ⋮ | ⋮ | ⋮ |

FIG.10

| LOCATION IDENTIFICATION INFORMATION | LOCATION POSITION | | |
|---|---|---|---|
| | z | x | y |
| 001 | 2 | 50 | 100 |
| ⋮ | ⋮ | ⋮ | ⋮ |

FIG.11

| | | AGE | | | | |
|---|---|---|---|---|---|---|
| | | 20 TO 29 | 30 TO 39 | 40 TO 49 | 50 TO 59 | ... |
| GENDER/HEALTH CONDITION | MALE A | 80 | 70 | 60 | 50 | ... |
| | MALE B | 70 | 60 | 50 | 40 | ... |
| | FEMALE A | 70 | 60 | 50 | 40 | ... |
| | FEMALE B | 60 | 50 | 40 | 30 | ... |
| | ⋮ | ⋮ | ⋮ | ⋮ | ⋮ | ⋮ |

FIG.12

| FIRST DEVICE IDENTIFICATION INFORMATION | SECOND DEVICE IDENTIFICATION INFORMATION |
|---|---|
| 101 | xxx.xxx.xxx.xxx |
| ⋮ | ⋮ |

FIG.13

| LOCATION IDENTIFICATION INFORMATION | FIRST DEVICE IDENTIFICATION INFORMATION | PER-UNIT USAGE FEE |
|---|---|---|
| 001 | - | 4000/h |
| - | 101 | 30/m |
| ⋮ | ⋮ | ⋮ |

DEVICE CONTROL SYSTEM, DEVICE CONTROLLER, AND DEVICE CONTROL METHOD

CROSS-REFERENCE TO RELATED APPLICATIONS

The present application claims priority to and incorporates by reference the entire contents of Japanese Patent Application No. 2014-054220 filed in Japan on Mar. 17, 2014.

BACKGROUND OF THE INVENTION

1. Field of the Invention

The present invention relates to a device control system, a device controller, and a device control method.

2. Description of the Related Art

There is known technology that performs control, when a reservation starts (a reservation time comes), to make a conference terminal provided in a reserved conference room and another conference terminal provided in another conference room communicable with each other, based on conference reservation information indicating a reservation date/time and a reserved conference room (refer to, e.g., Japanese Laid-open Patent Publication No. 2003-324533).

In the above conventional technology, device control is performed in accordance with the start of the reservation; however, a user does not always reach a reserved location at the reservation start time. Therefore, the device control is not always performed at a timing at which the device control is actually required.

Thus, execution of the device control in accordance with the start of the reservation may cause unnecessary energy consumption and deterioration in safety and user convenience.

In view of the above-described conventional problems, there is a need to provide a device control system, a device controller, and a device control method and a program that are capable of executing device control for controlling energy consumption and improving security and user convenience.

SUMMARY OF THE INVENTION

It is an object of the present invention to at least partially solve the problems in the conventional technology. According to the present invention, there is provided a device control system that controls a device connected thereto via a network, comprising: a reservation unit that receives location identification information for identifying a location, a use date/time at which the location is used, and user identification information for identifying a user who uses the location, and makes a reservation including use of the location and a device disposed at the location by the user at the use date/time; a determination unit that acquires user position information indicating a position of the user and location position information indicating a position of the location, and determines whether or not a predetermined relationship is established between the position of the user and the position of the location within a first time period before start of the use date/time; a control information generation unit that acquires device information including at least device identification information for identifying the device on the network, and uses the acquired device information to generate control information for controlling operation of the device; and a device control unit that controls operation of the device using the control information when the predetermined relationship is established.

The present invention also provides a device controller used in a device control system that controls a device connected thereto via a network, comprising: a reservation unit that receives location identification information for identifying a location, a use date/time at which the location is used, and user identification information for identifying a user who uses the location and makes a reservation including use of the location and a device disposed at the location by the user at the use date/time; a determination unit that acquires user position information indicating a position of the user and location position information indicating a position of the location and determines whether or not a predetermined relationship is established between the position of the user and the position of the location within a first time period before start of the use date/time; a control information generation unit that acquires device information including at least device identification information for identifying the device on the network and uses the acquired device information to generate control information for controlling operation of the device; and a device control unit that controls operation of the device using the control information when the predetermined relationship is established.

The present inventions also provides a device control method executed in a device control system that controls a device connected thereto via a network, comprising: a reservation step that receives location identification information for identifying a location, a use date/time at which the location is used, and user identification information for identifying a user who uses the location, and makes a reservation including use of the location and a device disposed at the location by the user at the use date/time; a determination step that acquires user position information indicating a position of the user and location position information indicating a position of the location, and determines whether or not a predetermined relationship is established between the position of the user and the position of the location within a first time period before start of the use date/time; a control information generation step that acquires device information including at least device identification information for identifying the device on the network, and uses the acquired device information to generate control information for controlling operation of the device; and a device control step that controls operation of the device using the control information when the predetermined relationship is established.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a view illustrating an example of user position information according to the embodiment;

FIG. 9 is a view illustrating an example of user information according to the embodiment;

FIG. 10 is a view illustrating an example of location position information according to the embodiment;

FIG. 11 is a view illustrating an example of moving speed information according to the embodiment;

FIG. 12 is a view illustrating an example of device information according to the embodiment;

FIG. 13 is a view illustrating an example of accounting information according to the embodiment;

DETAILED DESCRIPTION OF THE PREFERRED EMBODIMENTS

Hereinafter, with reference to the accompanying drawings, a device control system, a device controller, and a device control method according to the present invention will be described based on an embodiment of the invention.

Figure 1:
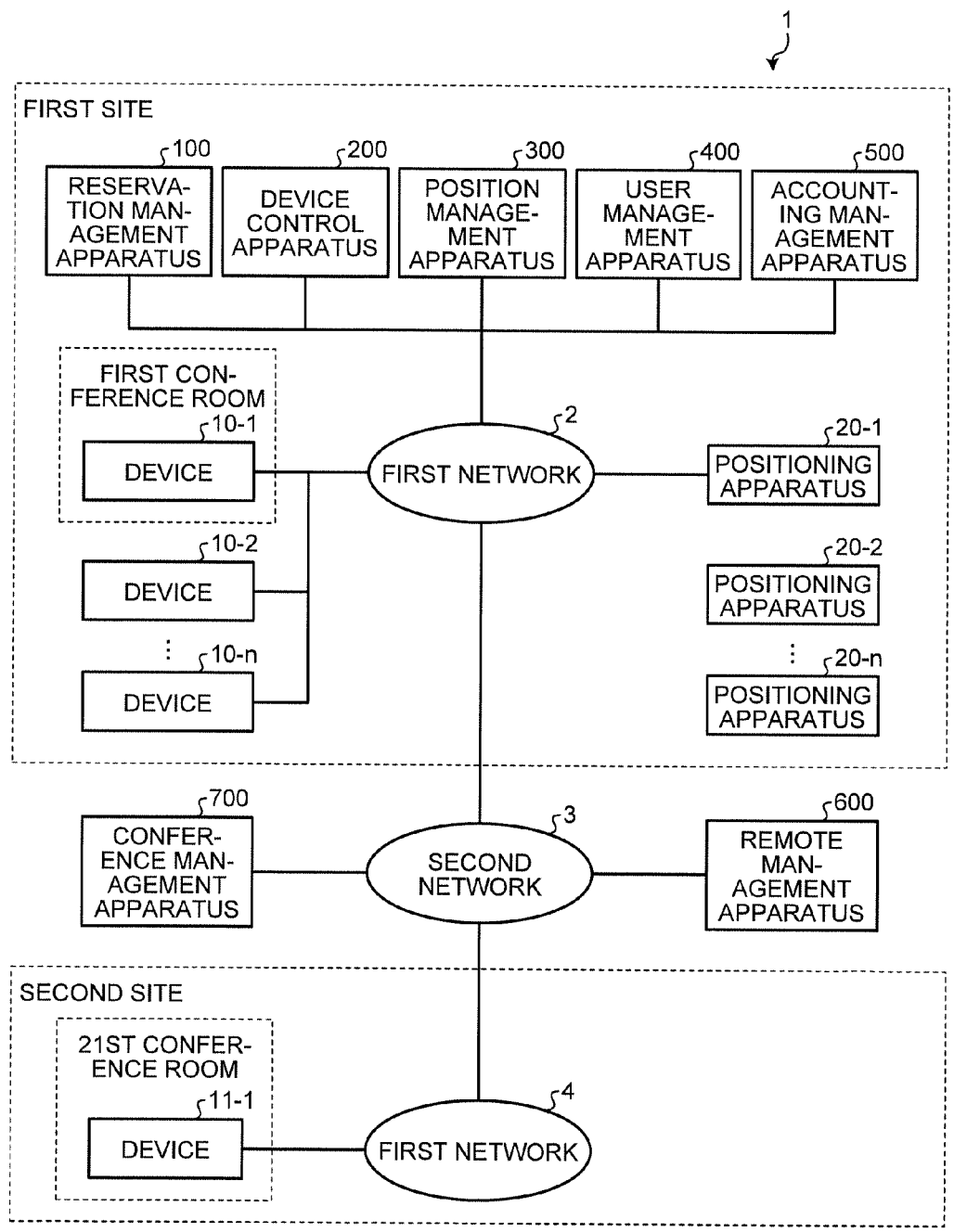
FIG. 1 is a block diagram illustrating an example of a configuration of a device control system according to an embodiment of the present invention.

FIG. 1 is a block diagram illustrating an example of a configuration of a device control system 1 according to the present embodiment. As illustrated in FIG. 1, the device control system 1 includes devices 10-1 to 10-$n$ (n is a natural number equal to or larger than 1), a device 11-1, positioning apparatuses 20-1 to 20-$m$ (m is a natural number equal to or larger than 1), a reservation management apparatus 100, a device control apparatus 200, a position management apparatus 300, a user management apparatus 400, an accounting management apparatus 500, a remote management apparatus 600, and a conference management apparatus 700.

In a first SITE, the devices 10-1 to 10-$n$, the positioning apparatuses 20-1 to 20-$m$, the reservation management apparatus 100, the device control apparatus 200, the position management apparatus 300, the user management apparatus 400, and the accounting management apparatus 500 are disposed. The device 10-1 is a device disposed (installed) in a first conference room in the first SITE. The devices and apparatuses disposed in the first SITE are connected to a first network 2.

In a second SITE, the device 11-1 is disposed. The device 11-1 is a device disposed (installed) in a 21st conference room in the second SITE. Although only the device 11-1 is shown in the second SITE in the example of FIG. 1, the same devices and apparatuses as those disposed in the first SITE are disposed actually. That is, in the example of FIG. 1, the devices and apparatuses other than the device 11-1 are not illustrated. The devices and apparatuses disposed in the second SITE including the device 11-1 are connected to a first network 4.

The first SITE and the second SITE are respectively company's hubs, such as an office or a factory, and are located in regions physically distanced from each other. Although the first SITE and the second SITE are shown as the hubs in the example of FIG. 1, the number of the hubs is not limited to two, but may be three or more.

The first network 2 and the first network 4 are connected to each other through a second network 3. The remote management apparatus 600 and the conference management apparatus 700 are connected to the second network 3. The first network 2 and the first network 4 may be, e.g., a LAN (Local Area Network) but not limited thereto. The second network 3 may be Internet, but not limited thereto, and may be a dedicated line and the like.

Each of the devices 10-1 to 10-$n$ and device 11-1 may be: an electronic device such as a conference terminal, an electronic blackboard, a projector, a fluorescent lamp, an air conditioner, a refrigerator, or an automatic vending machine; an image forming device such as a printer, copier, an MFP (Multifunction Peripheral), a scanner, or a facsimile device; or an information processing device such as an PC (Personal Computer) or a tablet terminal. The multifunction peripheral is a machine having at least two functions of a copier function, a printer function, a scanner function, and a facsimile function.

In the present embodiment, each of the devices 10-1 to 10-$n$ is a device to be managed by the device control apparatus 200, but not limited thereto. Hereinafter, the devices 10-1 to 10-$n$ are sometimes collectively referred to merely as "devices 10" when there is no need to distinguish therebetween.

Each of the positioning apparatuses 20-1 to 20-$m$ is an apparatus capable of measuring a position thereof and may be, e.g., an IC card-based employee ID card incorporating a GPS (Global Positioning System) receiver and the like or a mobile terminal. Hereinafter, the positioning apparatuses 20-1 to 20-$m$ are sometimes collectively referred to merely as "positioning apparatuses 20" when there is no need to distinguish therebetween. In the present embodiment, it is assumed that a user who is an employee of a company having the first SITE and second SITE retains the positioning apparatus 20.

Figure 2:
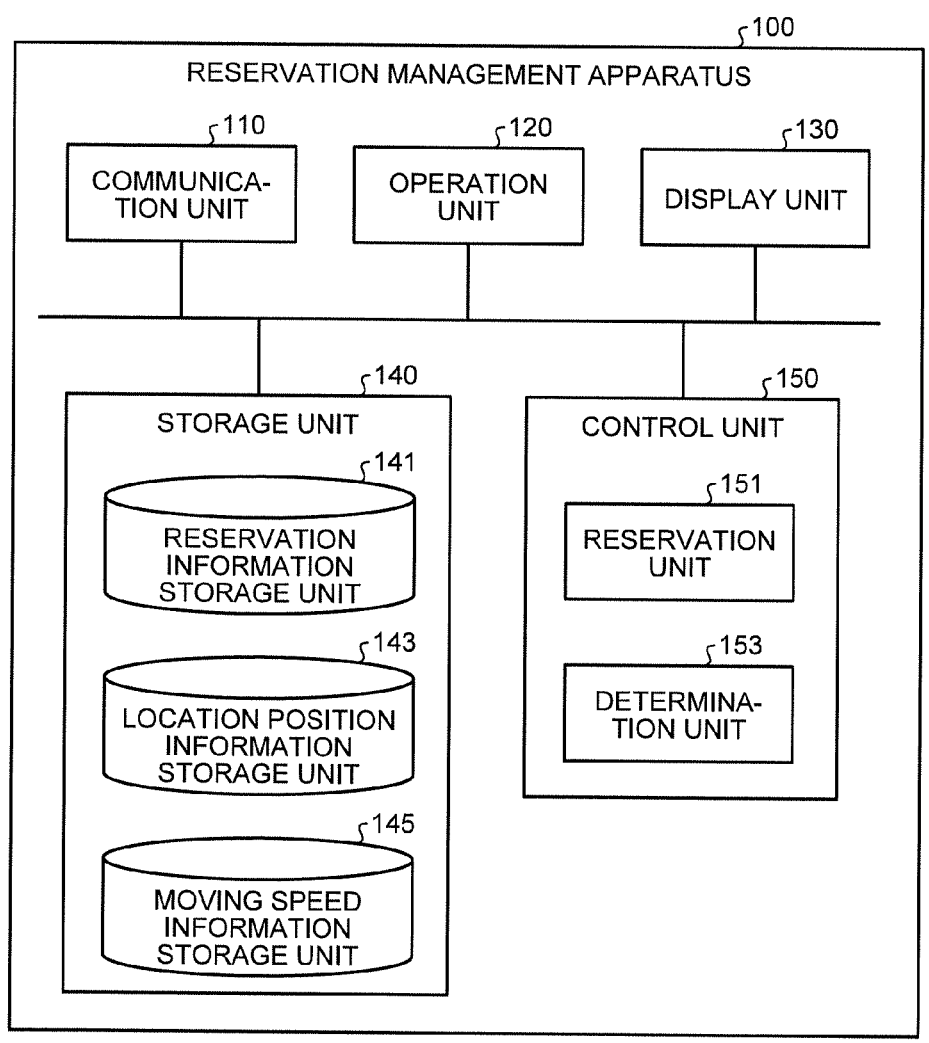
FIG. 2 is a block diagram illustrating an example of a configuration of a reservation management apparatus according to the embodiment.

FIG. 2 is a block diagram illustrating an example of a configuration of the reservation management apparatus 100 according to the present embodiment. As illustrated in FIG. 2, the reservation management apparatus 100 includes a communication unit 110, an operation unit 120, a display unit 130, a storage unit 140, and a control unit 150.

The communication unit 110 is configured to communicate with external devices, such as the device control apparatus 200, the position management apparatus 300, the user management apparatus 400, and the accounting management apparatus 500, through the network and can be embodied by a communication device such as an NIC (Network Interface Card).

The operation unit 120 is configured to perform various input operations and can be embodied by an input device such as a keyboard, a mouse, a touch pad, or a touch panel.

The display unit 130 is configured to display various screens and can be embodied by a display device such as a liquid crystal display device or a touch panel display device.

The storage unit 140 is configured to store various programs to be executed in the reservation management apparatus 100 and data used in various processing to be performed in the reservation management apparatus 100. The storage unit 140 can be embodied by at least one of magnetically, optically, and electrically storable storage devices, such as an HDD (Hard Disk Drive), an SSD (Solid State Drive), a memory card, an optical disk, a ROM (Read Only Memory), and a RAM (Random Access Memory).

The storage unit 140 includes a reservation information storage unit 141, a location position information storage unit 143, and a moving speed information storage unit 145. Details of the reservation information storage unit 141, location position information storage unit 143, and moving speed information storage unit 145 will be described later.

The control unit 150 is configured to control the above units included in the reservation management apparatus 100, and can be embodied by a controller such as a CPU (Central Processing Unit). The control unit 150 includes a reservation unit 151 and a determination unit 153. Details of the reservation unit 151 and determination unit 153 will be described later.

Figure 3:
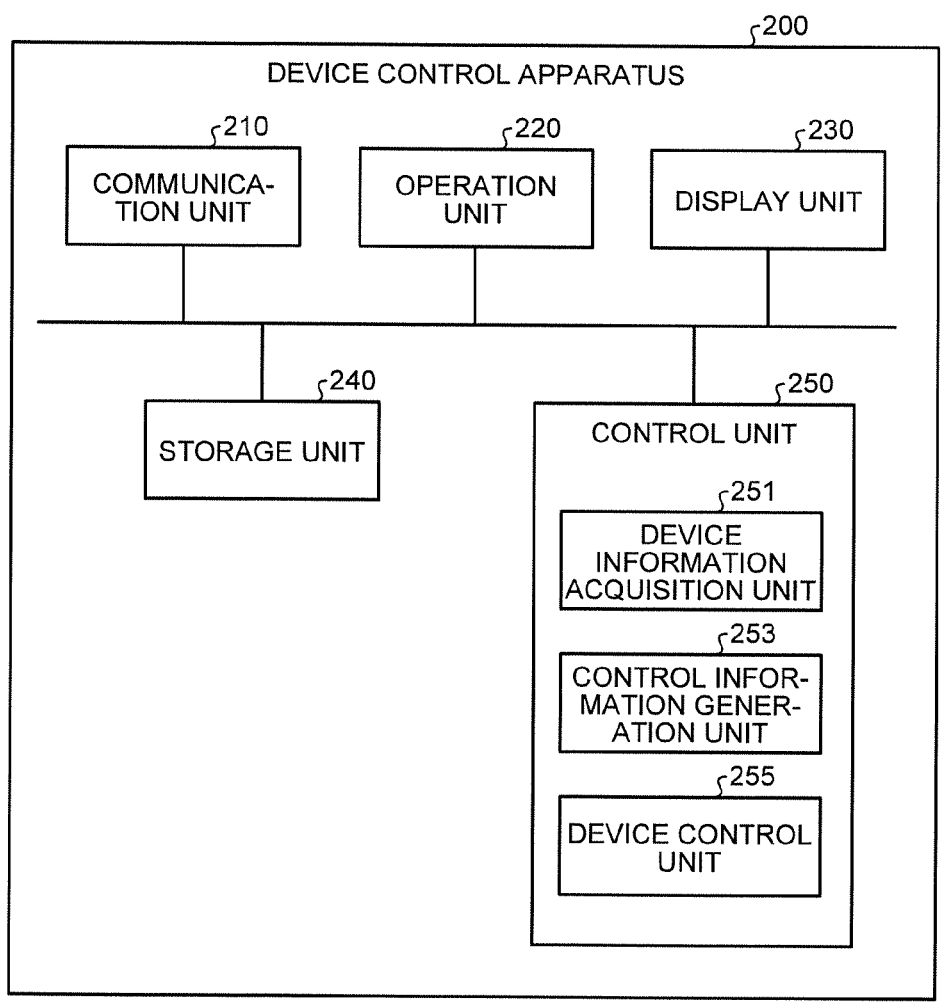
FIG. 3 is a block diagram illustrating an example of a configuration of a device control apparatus according to the embodiment.

FIG. 3 is a block diagram illustrating an example of a configuration of the device control apparatus 200 according to the present embodiment. As illustrated in FIG. 3, the device control apparatus 200 includes a communication unit 210, an operation unit 220, a display unit 230, a storage unit 240, and a control unit 250.

The communication unit 210 is configured to communicate with external devices, such as the devices 10-1 to 10-$n$, the reservation management apparatus 100, and the remote management apparatus 600, through the network and can be embodied by a communication device such as an NIC.

The operation unit 220 is configured to perform various input operations and can be embodied by an input device such as a keyboard, a mouse, a touch pad, or a touch panel.

The display unit 230 is configured to display various screens and can be embodied by a display device such as a liquid crystal display device or a touch panel display device.

The storage unit 240 is configured to store various programs to be executed in the device control apparatus 200 and data used in various processing to be performed in the device control apparatus 200. The storage unit 240 can be embodied by at least one of magnetically, optically, and electrically storable storage devices, such as an HDD, an SSD, a memory card, an optical disk, a ROM, and a RAM. Details of the storage unit 240 will be described later.

The control unit 250 is configured to control the above units included in the device control apparatus 200 and can be embodied by a controller such as a CPU. The control unit 250 includes a device information acquisition unit 251, a control information generation unit 253, and a device control unit 255. Details of the device information acquisition unit 251, the control information generation unit 253, and the device control unit 255 will be described later.

Figure 4:
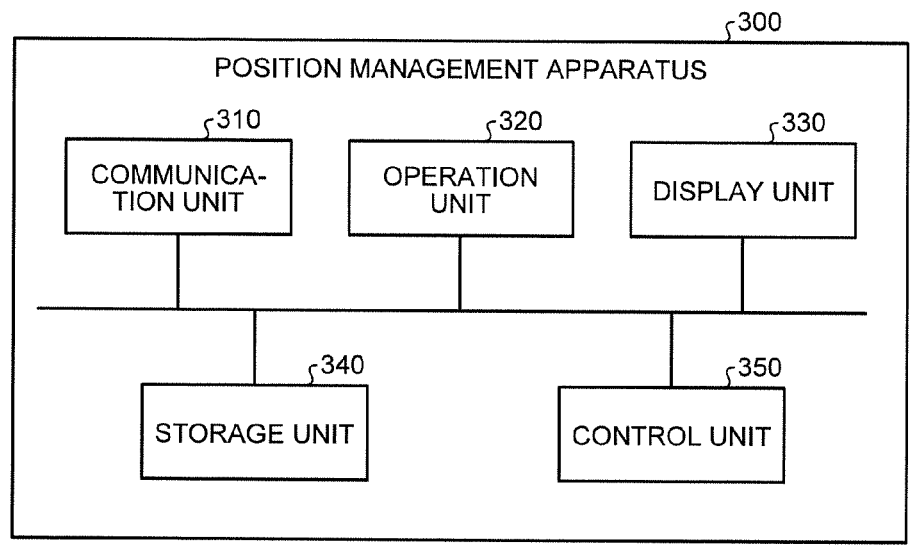
FIG. 4 is a block diagram illustrating an example of a configuration of a position management apparatus according to the embodiment.

FIG. 4 is a block diagram illustrating an example of a configuration of the position management apparatus 300 according to the present embodiment. As illustrated in FIG. 4, the position management apparatus 300 includes a communication unit 310, an operation unit 320, a display unit 330, a storage unit 340, and a control unit 350.

The communication unit 310 is configured to communicate with external devices, such as the positioning apparatuses 20-1 to 20-$m$ and reservation management apparatus 100, through the network and can be embodied by a communication device such as an NIC.

The operation unit 320 is configured to perform various input operations and can be embodied by an input device such as a keyboard, a mouse, a touch pad, or a touch panel.

The display unit 330 is configured to display various screens and can be embodied by a display device such as a liquid crystal display device or a touch panel display device.

The storage unit 340 is configured to store various programs to be executed in the position management apparatus 300 and data used in various processing to be performed in the position management apparatus 300. The storage unit 340 can be embodied by at least one of magnetically, optically, and electrically storable storage devices, such as an HDD, an SSD, a memory card, an optical disk, a ROM, and a RAM. Details of the storage unit 340 will be described later.

The control unit 350 is configured to control the above units included in the position management apparatus 300 and can be embodied by a controller such as a CPU. Details of the control unit 350 will be described later.

Figure 5:
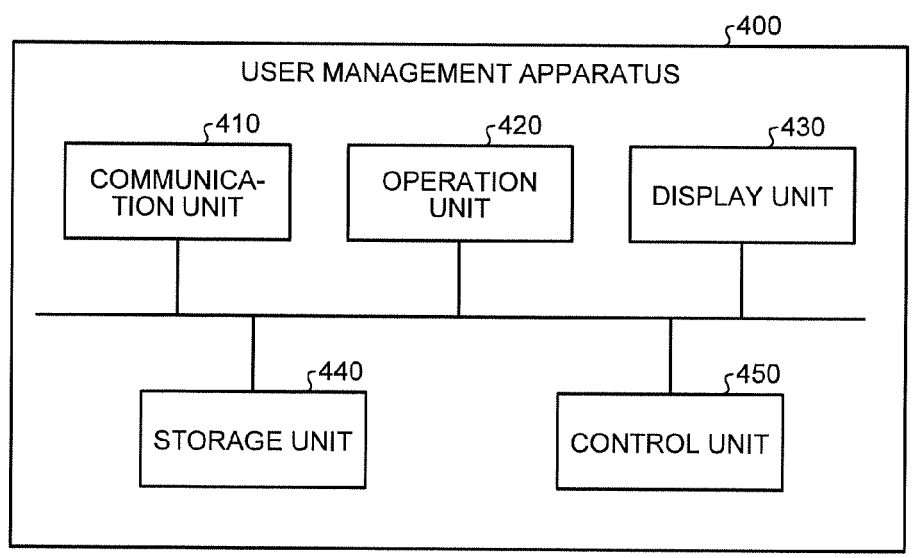
FIG. 5 is a block diagram illustrating an example of a configuration of a user management apparatus according to the embodiment.

FIG. 5 is a block diagram illustrating an example of a configuration of the user management apparatus 400 according to the present embodiment. As illustrated in FIG. 5, the user management apparatus 400 includes a communication unit 410, an operation unit 420, a display unit 430, a storage unit 440, and a control unit 450.

The communication unit 410 is configured to communicate with an external device, such as the reservation management apparatus 100, through the network and can be embodied by a communication device such as an NIC.

The operation unit 420 is configured to perform various input operations and can be embodied by an input device such as a keyboard, a mouse, a touch pad, or a touch panel.

The display unit 430 is configured to display various screens and can be embodied by a display device such as a liquid crystal display device or a touch panel display device.

The storage unit 440 is configured to store various programs to be executed in the user management apparatus 400 and data used in various processing to be performed in the user management apparatus 400. The storage unit 440 can be embodied by at least one of magnetically, optically, and electrically storable storage devices, such as an HDD, an SSD, a memory card, an optical disk, a ROM, and a RAM. Details of the storage unit 440 will be described later.

The control unit 450 is configured to control the above units included in the user management apparatus 400 and can be embodied by a controller such as a CPU. Details of the control unit 450 will be described later.

Figures 6, 7:
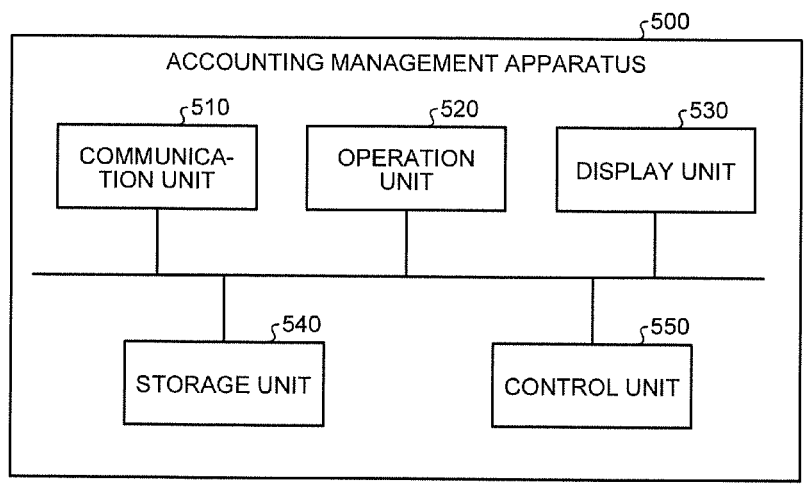
FIG. 6 is a block diagram illustrating an example of a configuration of an accounting management apparatus according to the embodiment.
FIG. 7 is a view illustrating an example of reservation information according to the embodiment.

FIG. 6 is a block diagram illustrating an example of a configuration of the accounting management apparatus 500 according to the present embodiment. As illustrated in FIG. 6, the accounting management apparatus 500 includes a communication unit 510, an operation unit 520, a display unit 530, a storage unit 540, and a control unit 550 (example of a calculation unit).

The communication unit 510 is configured to communicate with an external device, such as the reservation management apparatus 100, through the network and can be embodied by a communication device such as an NIC.

The operation unit 520 is configured to perform various input operations and can be embodied by an input device such as a keyboard, a mouse, a touch pad, or a touch panel.

The display unit 530 is configured to display various screens and can be embodied by a display device such as a liquid crystal display device or a touch panel display device.

The storage unit 540 is configured to store various programs to be executed in the accounting management apparatus 500 and data used in various processing to be performed in the accounting management apparatus 500. The storage unit 540 can be embodied by at least one of magnetically, optically, and electrically storable storage devices, such as an HDD, an SSD, a memory card, an optical disk, a ROM, and a RAM. Details of the storage unit 540 will be described later.

The control unit 550 is configured to control the above units included in the accounting management apparatus 500 and can be embodied by a controller such as a CPU. Details of the control unit 550 will be described later.

The following describes the reservation unit 151 and reservation information storage unit 141 of the reservation management apparatus 100.

The reservation unit 151 receives location identification information for identifying a location, a use date/time at which the location is used, and user identification information for identifying a user who uses the location. The reservation unit 151 then makes a reservation including use of the location and a device disposed at the location by the user during the use date/time.

For example, the reservation unit 151 receives the location identification information, the use date/time, and the user identification information from an information processing device that the user uses. The information processing device that the user uses may be one of the devices 10-2 to 10-n or a not-illustrated device other than the device 10. That is, in the present embodiment, the information processing device that the user uses may be a device to be managed by the device control apparatus 200 or a device not to be managed by the device control apparatus 200.

Then, the reservation unit 151 generates reservation information for making a reservation so that the user indicated by the received user identification information can use the location indicated by the received location identification information and device disposed at the location on the received use date/time. The reservation unit 151 subsequently stores the generated reservation information in the reservation information storage unit 141.

FIG. 7 is a view illustrating an example of the reservation information according to the present embodiment. In the example of FIG. 7, the reservation information is information including reservation identification information, location identification information, use date/time, user identification information, and first device identification information, but not limited thereto.

The reservation identification information is an identifier for identifying the reservation information and is, e.g., a reservation ID. The location identification information is an identifier for identifying a location and is, e.g., a location ID. The location is assumed to be a conference room in the present embodiment, but not limited thereto, and may be any location as long as the location can be reserved. The use date/time is a date/time at which the location indicated by the location identification information is used. The user identification information is an identifier for identifying a user who uses the location indicated by the location identification information and is, e.g., a user ID (employee ID). The first device identification information is an identifier for identifying a device disposed at the location indicated by the location identification information and is, i.e., a serial number or a model number.

The reservation information of FIG. 7 is generated by the reservation unit 151 causing the first device identification information (101) associated with the location identification information (001) to correspond to the location identification information (001) received from the information processing device that the user uses, use date/time (2014/2/1 13:00-15:00), and user identification information (301), as well as causing the reservation identification information (201) to be added.

That is, the reservation information of FIG. 7 indicated by the reservation identification information (201) means that the user indicated by the user identification information (301) uses the location indicated by the location identification information (001) and device indicated by the first device identification information (101) at the use date/time (2014/2/1 13:00-15:00).

In the present embodiment, the location identification information and first device identification information are previously associated with each other and stored in the storage unit 140. This allows the reservation unit 151 to acquire the first device identification information based on the location identification information received from the information processing device that the user uses.

For example, in the present embodiment, the location indicated by the location identification information (001) is the first conference room of the first SITE, the device indicated by the first device identification information (101) is the device 10-1, and the device that the user indicated by the user identification information (301) retains is positioning apparatus 20-1; however, they are not limited to the above examples, respectively.

Further, although one user uses the reserved location in the example of FIG. 7, but the number is not limited thereto and may be two or more. Further, although one device 10 is disposed in the reserved location in the example of FIG. 7, the number is not limited to this and may be two or more.

Further, in the present embodiment, inputting the location identification information makes it possible to reserve the device indicated by the first device identification information associated with the location identification information. Alternatively, however, the user may be allowed to select the first device identification information of the device that he or she wants to use from among one or more pieces of first device identification information associated with the location identification information for reserving the device to be used indicated by the selected first device identification information.

When an image forming device is included in the devices disposed in the reserved location, the reservation unit 151 may further receive input of electronic data to be used at the location to thereby include the electronic data in the reservation information, so as to make a reservation further including use of printed matter of the electronic data by the user.

Further, when a conference terminal is included in the devices disposed in the reserved location, the reservation unit 151 may further receive input of specific information that can specify another conference terminal communicating with the former conference terminal. Thereby, the reservation unit 151 may specify the another conference terminal from the specific information, and include the first device identification information of the specified another conference terminal, so as to make a reservation further including use of the another conference terminal by the user.

The specific information may be the location identification information of the location at which the another conference terminal is disposed. It is herein assumed that the another conference terminal is the device 11-1 and that the location indicated by the location identification information (specific information) is the 21st conference room of the second SITE. In this case, the reservation unit 151 uses the remote management apparatus 600 to acquire, from the reservation management apparatus (not illustrated) of the second SITE, information defining a correspondence relation between the location identification information and first device identification information. Thereby, the first device identification information of the device 11-1 can be acquired from the location identification information (specific information). However, the specific information may be the first device identification information itself of the another conference terminal.

The following describes the control unit 350 and storage unit 340 of the position management apparatus 300.

The control unit 350 uses the storage unit 340 to manage a position of the user. Specifically, the control unit 350 periodically acquires user position information from the positioning apparatus 20 that the user retains and updates the user position information stored in the storage unit 340 with the acquired user position information, to thereby manage the latest position of the user.

FIG. 8 is a view illustrating an example of the user position information according to the present embodiment. In the example of FIG. 8, the user position information is information including the user identification information and a user position, but not limited thereto.

The user identification information is an identifier for identifying a user who retains the positioning apparatus 20 and is, e.g., a user ID (employee ID). The user position is represented by zxy coordinates in the present embodiment, but not limited thereto. The z coordinate represents a height and each of the xy coordinates represent a plane position. In the present embodiment, although not limited thereto, a floor number of the SITE is used as a unit of the z coordinate, and m (meter) is used as a unit of each of the xy coordinates.

For example, the control unit 350 acquires, from the positioning apparatus 20-1, the user position information indicating that the user identification information is (301) and user position is (7, 50, 10). Subsequently, the control unit 350 retrieves, from the storage unit 340, the user position information indicating that the user identification information is (301), and updates the user position in the retrieved user position information to "z=7, x=50, y=10" as illustrated in FIG. 8.

The following describes the control unit 450 and the storage unit 440 of the user management apparatus 400.

The control unit 450 manages user information concerning the user on the storage unit 440. The user information is information for determining a moving speed of the user and indicates at least one of a gender, an age, and a health condition of the user.

FIG. 9 is a view illustrating an example of the user information according to the present embodiment. In the example of FIG. 9, the user information includes, but not limited to, the user identification information, a gender, an age, and a health condition.

The user identification information is an identifier for identifying a user and is, e.g., a user ID (employee ID). The health condition is represented by two levels, i.e., A and B (B is healthier than A) in the present embodiment, but not limited thereto. In the example of FIG. 9, the user indicated by user identification information (301) is a 52-year-old male having a health condition level of A.

The following describes the location position information storage unit 143, the moving speed information storage unit 145, and the determination unit 153 of the reservation management apparatus 100.

The location position information storage unit 143 stores location position information indicating a location to be reserved. FIG. 10 is a view illustrating an example of the location position information according to the present embodiment. In the example of FIG. 10, the location position information includes, but not limited to, location identification information and location position.

The location identification information is an identifier for identifying a location and is, e.g., a location ID. The location position is represented by, but not limited to, zxy coordinates (2, 50, 100) in the present embodiment. The z coordinate represents a height, and each of the xy coordinates each represent a plane position. In the present embodiment, although not limited thereto, a floor number of the SITE is used as a unit of the z coordinate, and m (meter) is used as a unit of each of the xy coordinates.

The moving speed information storage unit 145 stores moving speed information defining a moving speed for each user as a model. FIG. 11 is a view illustrating an example of the moving speed information according to the present embodiment. In the example of FIG. 11, the moving speed information defines, but not limited to, a moving speed (meters per minute: m/m) for each user as a model in a matrix as a combination of the age, gender, and health condition.

In the example of FIG. 11, the moving speed of a male whose health condition is level A is 80 m/m for ages 20 to 29, 70 m/m for ages 30 to 39, 60 m/m for ages 40 to 49, and 50 m/m for ages 50 to 59.

The determination unit 153 refers to the reservation information stored in the reservation information storage unit 141, and acquires the user position information of the user indicated by the user identification information included in the reservation information from the position management apparatus 300. The determination unit 153 further acquires the location position information of the location indicated by the location identification information included in the reservation information from the location position information storage unit 143.

Specifically, the determination unit 153 refers to the reservation information stored in the reservation information storage unit 141 to confirm presence/absence of reservation information that indicates that the use date/time thereof starts after a first time period. When the reservation information that indicates that the use date/time thereof starts after the first time period is present, the determination unit 153 acquires, from the position management apparatus 300, the user position information of the user indicated by the user identification information included in the reservation information. The determination unit 153 also acquires, from the location position information storage unit 143, the location position information of the location indicated by the location identification information included in the reservation information. The first time period can be set in accordance with usage of the device control system 1 and can be set to, e.g., 10 minutes.

Then, the determination unit 153 determines whether or not a predetermined relationship is established between the user position indicated by the acquired user position information and position of the location indicated by the acquired location position information within the first time period before the start of the use date/time.

Specifically, the determination unit 153 estimates, based on the user position indicated by the acquired user position information and position of the location indicated by the acquired location position information, an arrival time at which the user arrives at the location, and determines whether or not the arrival time is within a second time period. The second time period depends upon a device disposed at a location at which the user arrives or type of control to be performed for the device and, thus, details thereof will be described later.

In this case, the determination unit 153 acquires, from the user management apparatus 400, the user information of the user indicated by the user identification information included in the reservation information, and further uses the acquired user information to estimate the arrival time. Specifically, the determination unit 153 acquires, from the user management apparatus 400, the user information of the user indicated by the user identification information included in the reservation information that indicates that the use date/time thereof starts after the first time period. The determination unit 153 also acquires the moving speed information from the moving speed information storage unit 145.

Then, the determination unit 153 calculates, from the user position indicated by the acquired user position information and position of the location indicated by the acquired location position information, a value obtained by converting a distance from the user position to location position into a distance on a plane. The determination unit 153 further calculates the moving speed of the user from the acquired user information and moving speed information, estimates the arrival time from the calculated value and moving speed, and determines whether or not the arrival time is within the second time period.

When the arrival time becomes within the second time period, the determination unit 153 notifies the device control apparatus 200 of the first device identification information included in the reservation information.

The following describes a determination method of the determination unit 153 while giving concrete examples. It is assumed, for example, that the reservation information that indicates the use date/time thereof starts after the first time period is reservation information corresponding to the reservation identification information (201) of FIG. 7.

In this case, the determination unit 153 periodically acquires the user position information (see FIG. 8) corresponding to the user identification information (301) from the position management apparatus 300, and the location position information (see FIG. 10) corresponding to the location identification information (001) from the location position information storage unit 143. The determination unit 153 also periodically acquires the user information (see FIG. 9) corresponding to the user identification information (301) from the user management apparatus 400, and the moving speed information (see FIG. 11) from the moving speed information storage unit 145.

Every time the determination unit 153 acquires the user position information, it calculates, from a difference between the user position (7, 50, 10) indicated by the acquired user position information and location position (2, 50, 100) indicated by the acquired location position information, a value obtained by converting a distance from the user position to the location position into a distance on a plane.

The difference between the user position (7, 50, 10) and location position (2, 50, 100) is "z=5, x=0, and y=90". Here, it is assumed that a moving distance in the height direction (z coordinate) corresponding to one floor is converted to a distance of 40 m on a plane, but the conversion rate is not limited thereto. As a result, when the distance between the user position to the location position is converted into the distance on a plane, 290 m (5×40+0+90) is obtained.

Further, since the acquired user information indicates a 52-year-old male having a health condition level of A, the determination unit 153 determines that the moving speed of the user corresponding to the user identification information (301) is 50 m/m from the acquired moving speed information.

As a result, the determination unit 153 estimates that the arrival time is 5.8 minutes (5 minutes and 48 seconds). Then, the determination unit 153 determines whether or not the arrival time is within the second time period. When the arrival time becomes within the second time period, the determination unit 153 notifies the device control apparatus 200 of the first device identification information (101) to power on the device 10-1 indicated by the first device identification information (101). When the reservation includes use of printed matter of electronic data, the determination unit 153 may notify the device control apparatus 200 of the electronic data in addition to the first device identification information (101). Further, when the reservation includes use of another conference room, the determination unit 153 may notify the device control apparatus 200 of the first device identification information corresponding to the another conference room in addition to the first device identification information (101).

Note that, in the present embodiment, the control to turn on the power includes partial energization control (e.g., energizing only some of a plurality of substrates) in an power-on state of a main power supply or control to turn on a main power supply.

As described above, the second time period, herein, depends upon the device 10-1 indicated by the first device identification information (101) or type of control to be performed for the device 10-1. For example, when the device 10-1 is controlled to transit from a power-off state to a power-on state, a transit time from the power-off state to power-on state may be set as the second time period. Alternatively, for example, when the device 10-1 is controlled to transit from the power-off state to the power-on state and further to a network connected state, a transit time from the power-off state to the network connected state may be set as the second time period. Alternatively, for example, when the device 10-1 is an image forming device, a transition time from a power-off state to a print-ready state may be set as the second time period. Alternatively, for example, when the device 10-1 is a conference terminal, a transition time from a power-off state to a communicable state with another conference terminal may be set as the second time period.

Thus, the determination unit 153 may set the second time period depending on the device 10 indicated by the device identification information included in the reservation information or the type of control to be performed for the device 10. The type of control to be performed for the device 10 can be determined from, for example, reservation content (presence/absence of use of printed matter of electronic data). When a plurality pieces of the device identification information is included in the reservation information, the second time period may be set for every device 10 indicated by the pieces of device identification information.

Further, every time the determination unit 153 acquires the user position information after the use of the reserved location starts, it further determines whether or not the user position indicated by the acquired user position information falls outside the location position indicated by the acquired location position information. When the user position falls outside the position of the reserved location, the determination unit 153 notifies the device control apparatus 200 of the first device identification information (101) to turn off the power of the device 10-1 indicated by the first device identification information (101). When the reservation includes the use of printed matter of electronic data, the determination unit 153 may notify the device control apparatus 200 of an instruction for deleting the electronic data, in addition to the first device identification information (101). Note that, in the present embodiment, the control to turn off the power includes energization stop control in an on-state of a main power supply or control to turn off a main power supply.

The following describes the storage unit 240, the device information acquisition unit 251, the control information generation unit 253, and the device control unit 255 of the device control apparatus 200.

The device information acquisition unit 251 acquires device information from the devices 10-1 to 10-n and manages the acquired device information on the storage unit 240. Specifically, the device information acquisition unit 251 performs communication among the devices 10-1 to 10-n, using a general-purpose protocol, such as an SNMP (Simple Network Management Protocol) commonly used in device management to thereby acquire the device information. In the above device information acquisition, the device information acquisition unit 251 may proactively acquire the device information from the devices 10-1 to 10-n, or the devices 10-1 to 10-n may proactively notify the device control apparatus 200 (device information acquisition unit 251) of the device information.

The device information according to the present embodiment includes at least second device identification information (an example of the device identification information) for identifying the device 10 on the network. FIG. 12 is a view illustrating an example of the device information according to the present embodiment. In the example of FIG. 12, the device information is information including the first device identification information and second device identification information, but not limited thereto.

The first device identification information is an identifier for identifying the device 10 and is, e.g., a serial number or a model number. The second device identification information is an identifier for identifying the device 10 on the network and is, e.g., an IP address.

The control information generation unit 253 acquires, from the storage unit 240, device information including the first device identification information notified thereto from the reservation management apparatus 100 for powering on the device 10. The control information generation unit 253 then uses the acquired device information to generate first control information for controlling the device 10 indicated by the first device identification information at least into a power-on state. The first control information includes at least a power-on command for a WOL (Wake On LAN) using the second device identification information.

In the present embodiment, when the reservation management apparatus 100 determines that the arrival time is expected to be within the second time period, it notifies the device control apparatus 200 of the first device identification information so as to power on the device 10. Consequently, the control information generation unit 253 generates the first control information after the arrival time becomes within the second time period. However, the generation timing of the first control information is not limited to this, but the first control information may be generated in advance.

For example, it is assumed herein that the first device identification information (101) is notified to the device control apparatus 200 for powering on the device 10-1. In this case, the control information generation unit 253 acquires the device information (see FIG. 12) including the first device identification information (101) from the storage unit 240 and generates, as the first control information for controlling the device 10-1 into a power-on state, control information including the power-on command for WOL using the second device identification information (xxx.xxx.xxx.xxx).

The control information generation unit 253 may generate, as the first control information, control information including a command for controlling the device 10-1 into a network connected state in addition to the power-on command for WOL using the second device identification information (xxx.xxx.xxx.xxx).

Further, when the device 10-1 is an image forming device, the control information generation unit 253 may generate, as the first control information, control information including electronic data notified from the reservation management apparatus 100 and a command for generating printed matter of the electronic data, in addition to the power-on command for WOL using the second device identification information (xxx.xxx.xxx.xxx).

Alternatively, when the device 10-1 is a conference terminal, the control information generation unit 253 may generate, as the first control information, control information including the second device identification information based on the first device identification information corresponding to another conference terminal notified from the reservation management apparatus 100 and a command for making the conference terminal communicable state with the another conference terminal, in addition to the power-on command for WOL using the second device identification information (xxx.xxx.xxx.xxx).

For example, assuming that the another conference terminal is the device 11-1, the control information generation unit 253 uses the remote management apparatus 600 to acquire the device information from a device control apparatus (not illustrated) in the second SITE. Thereby, the second device identification information can be acquired from the first device identification information corresponding to the another conference terminal.

Further, for example, assume that the first device identification information (101) is notified, from the reservation management apparatus 100, to the device control apparatus 200 for powering off the device 10-1. In this case, the control information generation unit 253 acquires the device information (see FIG. 12) including the first device identification information (101) from the storage unit 240 and generates, as the second control information for controlling the device 10-1 into a power-off state, control information including a power-off command for WOL using the second device identification information (xxx.xxx.xxx.xxx).

When the device 10-1 is an image forming device, the control information generation unit 253 may generate, as the second control information, control information including a command for deleting electronic data based on an electronic data deletion instruction notified from the reservation management apparatus 100, in addition to the power-off command for WOL using the second device identification information (xxx.xxx.xxx.xxx).

When it is determined by the reservation management apparatus 100 that a predetermined relationship is established between the user position indicated by the user position information and location position indicated by the location position information, the device control unit 255 uses the first control information generated by the control information generation unit 253 to control the device 10 at least into a power-on state.

Specifically, when it is determined by the reservation management apparatus 100 that the arrival time is expected to be within the second time period, the device control unit 255 uses the first control information generated by the control information generation unit 253 to control the device 10 at least into a power-on state.

For example, it is assumed that the first control information is control information including the power-on command for WOL using the second device identification information (xxx.xxx.xxx.xxx). In this case, the device control unit 255 uses the first control information to control the device 10-1 into a power-on state.

Further, for example, it is assumed that the first control information is control information including a command for controlling the device 10-1 into a network connected state, in addition to the power-on command for WOL using the second device identification information (xxx.xxx.xxx.xxx). In this case, the device control unit 255 uses the first control information to control the device 10-1 into a power-on state and a network connected state.

Further, for example, it is assumed that the first control information is control information including electronic data and a command for generating printed matter of the electronic data, in addition to the power-on command for WOL using the second device identification information (xxx.xxx.xxx.xxx). In this case, the device control unit 255 uses the first control information to control the device 10-1 as an image forming device into a power-on state as well as causes the device 10-1 to generate printed matter of the electronic data.

Further, for example, it is assumed that the first control information is control information including the second device identification information (xxx.xxx.xxx.xxx), second device identification information corresponding to another conference terminal, and a command for making the device 10-1 as a conference terminal into a communicable state with the another conference terminal, in addition to the power-on command for WOL using the second device identification information (xxx.xxx.xxx.xxx). In this case, the device control unit 255 uses the first control information to control the device 10-1 as the conference terminal into a power-on state and a communicable state with the another conference terminal. Specifically, the device control unit 255 controls the device 10-1 as the conference terminal into a power-on state and causes the device 10-1 to transmit the second device identification information (xxx.xxx.xxx.xxx) and second device identification information of the another conference terminal to the conference management apparatus 700. This allows the conference management apparatus 700 to control the device 10-1 and another conference terminal into a mutually communicable state.

Further, for example, it is assumed that the second control information is control information including the power-OFF command for WOL using the second device identification information (xxx.xxx.xxx.xxx). In this case, the device control unit 255 uses the second control information to control the device 10-1 into a power-off state.

Further, for example, it is assumed that the second control information is control information including a command for deleting electronic data in addition to the power-off command for WOL using the second device identification information (xxx.xxx.xxx.xxx). In this case, the device control unit 255 uses the second control information to cause the device 10-1 to delete the electronic data as well as to control the device 10-1 into a power-off state.

The device control unit 255 then notifies the reservation management apparatus 100 of an actual use start time at which it controls the device 10 into a power-on state and an actual use end time at which it controls the device 10 into a power-off state, together with the first device identification information corresponding to the device 10.

The following describes the storage unit 540 and control unit 550 of the accounting management apparatus 500.

The storage unit 540 stores accounting information. FIG. 13 is a view illustrating an example of the accounting information according to the present embodiment. In the example of FIG. 13, the accounting information is information including the location identification information, the first device identification information, and a per-unit usage fee, but not limited thereto.

The location identification information is an identifier for identifying a location and is, e.g., a location ID. The first device identification information is an identifier for identifying a device and is, e.g., a serial number or a model number. The per-unit usage fee is a per hour usage fee of the location indicated by the location identification information or device indicated by the first device identification information.

In the example of FIG. 13, the per hour usage fee of the location indicated by the location identification information (001) is 4,000 yen per hour, and per hour usage fee of the device indicated by the first device identification information (101) is 30 yen per minute.

The control unit 550 acquires, from the reservation management apparatus 100, the actual use start time, actual use end time, and first device identification information of the device 10 disposed at a reserved location and, further, the location identification information corresponding to the reserved location. Then, the control unit 550 calculates an actual use time of the reserved location and that of the device 10 disposed at the reserved location from the actual use start time and actual use end time, and calculates the usage fee of the reserved location and the device 10 disposed at the reserved location with reference to the accounting information stored in the storage unit 540.

The control unit 550 may further acquire the user identification information corresponding to a user that uses the reserved location and manage the calculated usage fee in association with the user identification information. This allows the usage fee on a per-user basis to be managed as expenses. In this case, it is preferable that the user is not a conference participant but a conference sponsor.

Figure 14:
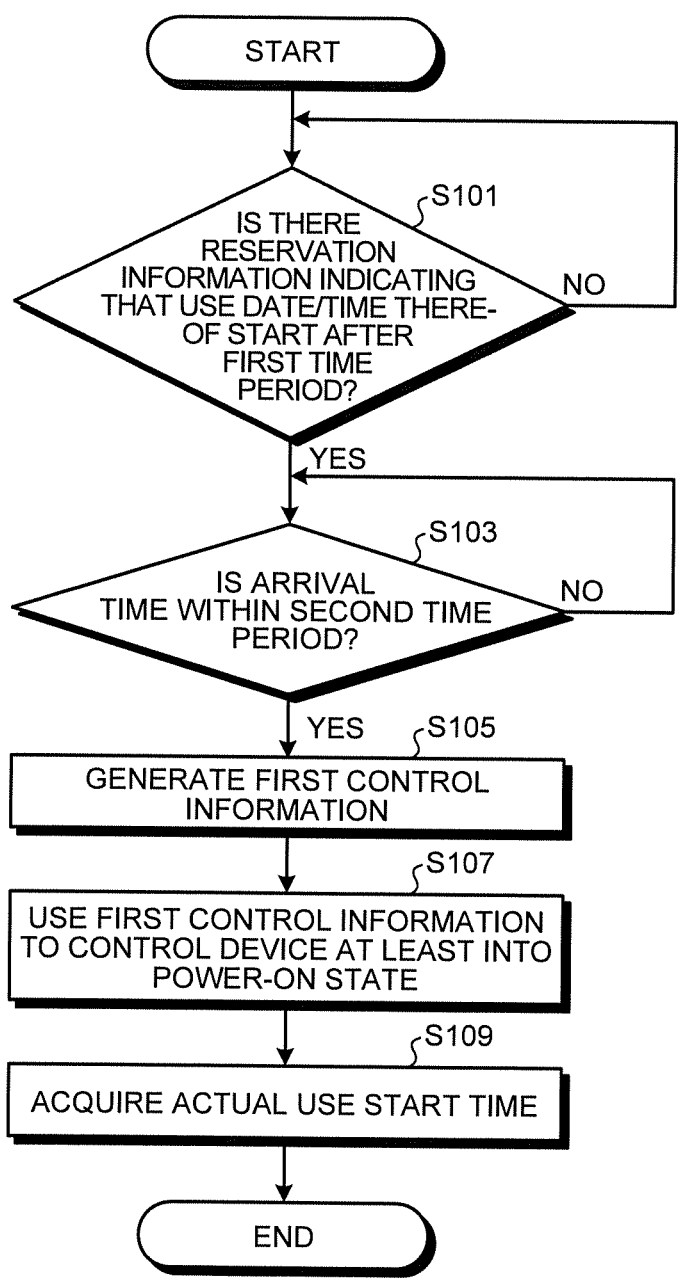
FIG. 14 is a flowchart illustrating an example of start processing to be performed in the device control system according to the embodiment.

FIG. 14 is a flowchart illustrating an example of start processing to be performed in the device control system 1 according to the present embodiment.

The determination unit 153 refers to the reservation information stored in the reservation information storage unit 141 to confirm presence/absence of reservation information that indicates that the use date/time thereof starts after the first time period (step S101). When there is no reservation information that indicates that the use date/time thereof starts after the first time period ("No" in step S101), the processing flow returns to step S101.

When the reservation information that indicates that the use date/time thereof starts after the first time period is present ("Yes" in step S101), the determination unit 153 determines whether or not an arrival time of a user indicated by the user identification information included in the reservation information at a location indicated by the location identification information included in the reservation information is within the second time period (step S103). When the arrival time is not within the second time period ("No" in step S103), the processing flow returns to step S103.

When the arrival time is within the second time period ("Yes" in step S103), the determination unit 153 notifies the device control apparatus 200 of the first device identification information included in the reservation information so as at least to power on a device indicated by the first device identification information. The control information generation unit 253 generates, based on the received first device identification information, the first control information for controlling the device 10 indicated by the first device identification information at least into a power-on state (step S105).

Subsequently, the device control unit 255 uses the first control information to control the device 10 at least into a power-on state (step S107).

Subsequently, the device control unit 255 acquires the actual use start time at which it controls the device 10 into a power-ON state, and notifies the reservation management apparatus 100 of the acquired actual use start time (step S109).

Figure 15:
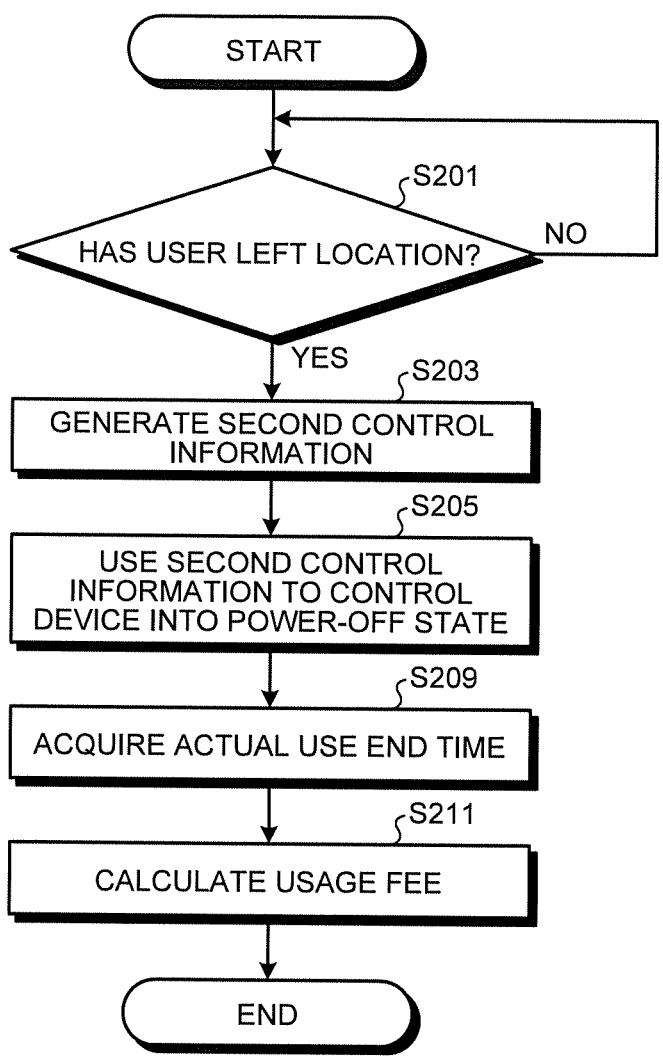
FIG. 15 is a flowchart illustrating end processing to be performed in the device control system according to the embodiment.

FIG. 15 is a flowchart illustrating end processing to be performed in the device control system 1 according to the present embodiment.

The determination unit 153 confirms whether or not the user indicated by the user identification information included in the reservation information has left the location indicated by the location identification information included in the reservation information, after starting to use the reserved location (step S201). When the user has not left the location ("No" in step S201), the processing flow returns to step S201.

After the user leaves the location ("Yes" in step S201), the determination unit 153 notifies the device control apparatus 200 of the first device identification information included in the reservation information so as to power off the device 10 indicated by the first device identification information. The control information generation unit 253 generates, based on the received first device identification information, second control information for controlling the device 10 indicated by the first device identification information into a power-off state (step S203).

Subsequently, the device control unit 255 uses the second control information to control the device 10 into a power-off state (step S205).

Subsequently, the device control unit 255 acquires the actual use end time at which it controls the device 10 into a power-off state, and notifies the reservation management apparatus 100 of the acquired actual use end time (step S209).

Subsequently, the control unit 550 uses the actual use start time and actual use end time received from the reservation management apparatus 100, and the first device identification information corresponding to the device 10 and the location identification information corresponding to the reserved location to calculate the usage fee of the reserved location and the device 10 disposed at the reserved location (step S211).

As described above, in the present embodiment, device control for the device disposed at the reserved location is performed using not only the reservation information, but also the position information of the user. Thus, according to the present embodiment, the device control is not started until a time when the user arrives at the reserved location comes even after the expected use time has come, thereby suppressing energy consumption and improving security. Further, according to the present embodiment, the device control is started when the user arrives at the reserved location even before the start of the use time, thus improving user convenience.

Modification

In the above embodiment, the accounting management apparatus 500 may be excluded from the first SITE by imparting the function of the accounting management apparatus 500 to the remote management apparatus 600.

Further, in the above embodiment, when a device indicated by the device identification information included in the reservation information is a conference terminal, and a plurality pieces of user identification information is included in the reservation information, the determination unit 153 may perform the determination processing using user identification information corresponding to a conference sponsor from among the plurality pieces of user identification information.

Further, in the above embodiment, a part of or all of the functions of the reservation management apparatus 100, the device control apparatus 200, the position management apparatus 300, the user management apparatus 400, and the accounting management apparatus 500 may be integrated in one apparatus. For example, the functions of the reservation management apparatus 100 and the device control apparatus 200 may be integrated in one apparatus.

Hardware Configuration

Figure 16:
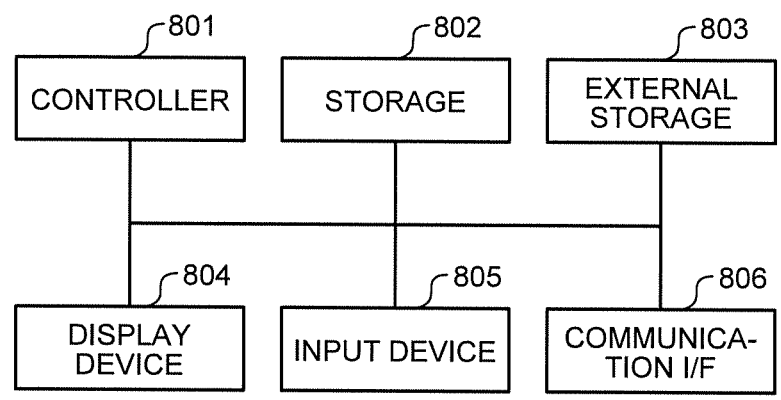
FIG. 16 is a view illustrating an example of a hardware configuration of each apparatus of the embodiment.

FIG. 16 is a view illustrating an example of a hardware configuration of each of the reservation management apparatus 100, the device control apparatus 200, the position management apparatus 300, the user management apparatus 400, the accounting management apparatus 500, the remote management apparatus 600, and the conference management apparatus 700 according to the above embodiment (hereinafter, collectively referred to "each apparatus of the above embodiment"). Each apparatus according to the above embodiment includes a controller 801 such as a CPU, a storage 802 such as a ROM or a RAM, an external storage 803 such as an HDD, a display device 804 such as a display, an input device 805 such as a keyboard or a mouse, and a communication I/F (interface) 806, and has a hardware configuration using a common computer.

A program executed in each apparatus of the above embodiment is provided by being recorded as a file in an installable format or an executable format in a computer readable recording medium, such as a CD-ROM, a CD-R, a memory card, a DVD (Digital Versatile Disk), or a flexible disk (FD).

Alternatively, the program to be executed in each apparatus of the above embodiment may be provided by being stored in a computer connected to a network, such as Internet, and downloaded over the network. Further alternatively, the program to be executed in each apparatus of the above embodiment may be provided or distributed over a network such as Internet. Still further alternatively, the program to be executed in each apparatus of the above embodiment may be previously loaded in a ROM or the like and provided in that form.

The program to be executed in each apparatus of the above embodiment has a module configuration for achieving, on a computer, each component mentioned above. As an actual hardware, a CPU reads and executes the program from an HDD to a RAM and, thereby, the above respective components are achieved on the computer.

According to the present invention, it is possible to execute device control while controlling energy consumption and improving security and user convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device control system that controls a device connected thereto via a network, comprising:
    a reservation unit that receives location identification information for identifying a location, a use date/time at which the location is used, and user identification information for identifying a user who uses the location, and makes a reservation including use of the location and a device disposed at the location by the user at the use date/time;
    a determination unit that acquires user position information indicating a position of the user and location position information indicating a position of the location, and determines whether or not a predetermined relationship is established between the position of the user and the position of the location within a first time period before start of the use date/time;
    a control information generation unit that acquires device information including at least device identification information for identifying the device on the network, and uses the acquired device information to generate control information for controlling operation of the device; and
    a device control unit that controls operation of the device using the control information when the predetermined relationship is established.

2. The device control system according to claim 1, wherein the determination unit estimates, based on the position of the user and the position of the location, an arrival time at which the user arrives at the location and determines whether or not the arrival time is within a second time period, and the device control unit uses the control information to control the device at least into a power-on state when the arrival time becomes within the second time period.

3. The device control system according to claim 2, wherein the determination unit further acquires user information concerning the user and uses the acquired user information to estimate the arrival time.

4. The device control system according to claim 3, wherein the user information is information for determining a moving speed of the user.

5. The device control system according to claim 4, wherein the user information indicates at least one of a gender, an age, and a health condition of the user.

6. The device control system according to claim 1, wherein
the control information further includes control information for making the device into a network connected state, and
the device control unit uses the control information to control the device into a network connected state.

7. The device control system according to claim 1, wherein
the device is an image forming device having a printing unit,
the reservation unit further receives an input of electronic data being to be used in the location and further makes a reservation including use of the printed matter of the electronic data by the user,
the control information generation unit uses the device information and the electronic data to generate, as the control information, information for causing the image forming device to generate the printed matter, and
the device control unit uses the control information to cause the image forming device to generate the printed matter.

8. The device control system according to claim 1, wherein
the device is a conference terminal,
the reservation unit further receives an input of specific information that can specify another conference terminal communicating with the former conference terminal, and specifies the another conference terminal from the specific information,
the control information generation unit further acquires device information including at least device identification information for identifying the another conference terminal, and uses the device information of the conference terminal and device information of the another conference terminal to generate, as the control information, information for making the conference terminal into a communicable state with the another conference terminal, and
the device control unit uses the control information to make the conference terminal into a communicable state with the another conference terminal.

9. The device control system according to claim 1, wherein
the determination unit further determines whether or not the position of the user falls outside the position of the location,
the control information generation unit uses the device information to further generate, as the control information, information for controlling the device to transit from a power-on state to a power-off state, and
when the position of the user falls outside the location position, the device control unit uses the control information to control the device to transit from the power-on state to the power-off state.

10. The device control system according to claim 7, wherein
the determination unit further determines whether or not the position of the user falls outside the position of the location,
the control information generation unit uses the device information to further generate, as the control information, information for causing the image forming device to delete the electronic data, and
when the position of the user falls outside the location position, the device control unit uses the control information to cause the image forming device to delete the electronic data.

11. The device control system according to claim 9, further comprising a calculation unit that acquires an actual use start time at which the device is controlled into a power-on state, an actual use end time at which the device is controlled into a power-off state, and usage fee information indicating a per hour usage fee of at least one of the location and the device, and calculates a usage fee of at least one of the location and the device.

12. The device control system according to claim 10, further comprising a calculation unit that acquires an actual use start time at which the device is controlled into a power-on state, an actual use end time at which the device is controlled into a power-off state, and usage fee information indicating a per hour usage fee of at least one of the location and the device, and calculates a usage fee of at least one of the location and the device.

13. A device controller used in a device control system that controls a device connected thereto via a network, comprising:
a reservation unit that receives location identification information for identifying a location, a use date/time at which the location is used, and user identification information for identifying a user who uses the location and makes a reservation including use of the location and a device disposed at the location by the user at the use date/time;
a determination unit that acquires user position information indicating a position of the user and location position information indicating a position of the location and determines whether or not a predetermined relationship is established between the position of the user and the position of the location within a first time period before start of the use date/time;
a control information generation unit that acquires device information including at least device identification information for identifying the device on the network and uses the acquired device information to generate control information for controlling operation of the device; and
a device control unit that controls operation of the device using the control information when the predetermined relationship is established.

14. A device control method executed in a device control system that controls a device connected thereto via a network, comprising:
a reservation step that receives location identification information for identifying a location, a use date/time at which the location is used, and user identification information for identifying a user who uses the location, and makes a reservation including use of the location and a device disposed at the location by the user at the use date/time;
a determination step that acquires user position information indicating a position of the user and location position information indicating a position of the location, and determines whether or not a predetermined relationship is established between the position of the user and the position of the location within a first time period before start of the use date/time;

a control information generation step that acquires device information including at least device identification information for identifying the device on the network, and uses the acquired device information to generate control information for controlling operation of the device; and a device control step that controls operation of the device using the control information when the predetermined relationship is established.

* * * * *